US010949503B1

(12) United States Patent
Morlen et al.

(10) Patent No.: US 10,949,503 B1
(45) Date of Patent: *Mar. 16, 2021

(54) SYSTEMS AND METHODS FOR SECURE ONLINE REPOSITORIES

(71) Applicant: United Services Automobile Association (USAA), San Antonio, TX (US)

(72) Inventors: Randy Ray Morlen, San Antonio, TX (US); Charles Lee Oakes, III, Boerne, TX (US); Rickey Dale Burks, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 205 days.

This patent is subject to a terminal disclaimer.

(21) Appl. No.: 16/372,071

(22) Filed: Apr. 1, 2019

Related U.S. Application Data

(63) Continuation of application No. 15/621,701, filed on Jun. 13, 2017, now Pat. No. 10,289,813, which is a continuation of application No. 11/863,060, filed on Sep. 27, 2007, now Pat. No. 9,710,615.

(51) Int. Cl.
    *G06F 21/10*           (2013.01)
(52) U.S. Cl.
    CPC ................ *G06F 21/10* (2013.01)
(58) Field of Classification Search
    CPC ....................................... G06F 21/00
    USPC ......................................... 705/26.1
    See application file for complete search history.

(56) References Cited

U.S. PATENT DOCUMENTS

| 4,055,746 A | 10/1977 | Peterson et al. |
| 4,491,725 A | 1/1985 | Pritchard |
| 4,689,478 A | 8/1987 | Hale et al. |
| 4,739,295 A | 4/1988 | Hayashi et al. |
| 4,868,376 A | 9/1989 | Lessin et al. |
| 5,704,364 A | 1/1998 | Saltzstein |

(Continued)

OTHER PUBLICATIONS

Allardice, Carryl, Subscription Agents, Libraries and Other Involved in the Information Dissemination Process, 309-315, 1997, http://sandbox.scix.net/data/works/att/97129.content.pdf.

(Continued)

*Primary Examiner* — Alexis M Casey
(74) *Attorney, Agent, or Firm* — Fish & Richardson P.C.

(57) ABSTRACT

Mechanisms are disclosed herein for storing various records. Numerous keys and parties can access online repositories. These repositories contain a plurality of lockboxes, structured hierarchically and otherwise, providing public and private areas with varying levels of access. Some content of such lockboxes can be sharable. These lockboxes can be used not only to store diverse content, ranging from birth certificates to deeds and social security numbers, but they can also be accessed in a variety of ways. For example, keys to lockboxes can be made available by such events as the issuing of death certificates or birth certificates. Alternatively, keys can be issued according to various rules and heuristics stipulated by lockbox users. In either case, the plurality of lockboxes residing in repositories can be configured to provide centralized storage facilities that are secure and readily accessible from various computing devices.

20 Claims, 11 Drawing Sheets

(56) References Cited

U.S. PATENT DOCUMENTS

| | | |
|---|---|---|
| 5,763,862 A | 6/1998 | Jachimowicz et al. |
| 5,864,871 A | 1/1999 | Kitain et al. |
| 5,910,987 A | 6/1999 | Ginter et al. |
| 5,917,912 A | 6/1999 | Ginter et al. |
| 6,085,174 A | 7/2000 | Edelman |
| 6,122,625 A | 9/2000 | Rosen |
| 6,192,472 B1 | 2/2001 | Garay et al. |
| 6,246,991 B1 | 6/2001 | Abe et al. |
| 6,301,660 B1 | 10/2001 | Benson |
| 6,411,943 B1 | 6/2002 | Crawford |
| 6,735,623 B1 | 5/2004 | Prust |
| 6,892,300 B2 | 5/2005 | Carroll |
| 6,903,972 B2 | 6/2005 | Lasser |
| 6,970,836 B1 | 11/2005 | Paltenghe |
| 7,043,754 B2 | 5/2006 | Arnouse |
| 7,062,535 B1 | 6/2006 | Stark et al. |
| 7,103,604 B2 | 9/2006 | Maeda |
| 7,117,171 B1 | 10/2006 | Pollin |
| 7,176,732 B2 | 2/2007 | Innocent |
| 7,181,017 B1 | 2/2007 | Nagel |
| 7,216,106 B1 | 5/2007 | Buchanan |
| 7,337,172 B2 | 2/2008 | Shapiro |
| 7,395,436 B1 | 7/2008 | Nemovicher |
| 7,420,456 B2 | 9/2008 | Fisher |
| 7,441,277 B2 | 10/2008 | Burges et al. |
| 7,580,877 B1 | 8/2009 | Argenbright |
| 7,587,366 B2 | 9/2009 | Grim et al. |
| 7,606,558 B2 | 10/2009 | Despain et al. |
| 7,716,732 B2 | 5/2010 | Dodson et al. |
| 8,260,692 B1 | 9/2012 | Miller et al. |
| 2001/0047347 A1 | 11/2001 | Perell et al. |
| 2001/0056387 A1 | 12/2001 | Magary |
| 2002/0042773 A1 | 4/2002 | Fugitte et al. |
| 2002/0046188 A1 | 4/2002 | Burges et al. |
| 2002/0111946 A1* | 8/2002 | Fallon ................ G06Q 10/10 |
| 2002/0138426 A1 | 9/2002 | Craddick |
| 2002/0169632 A1 | 11/2002 | Grossman |
| 2003/0012346 A1 | 1/2003 | Langhart et al. |
| 2003/0065539 A1 | 4/2003 | Kay |
| 2003/0097331 A1 | 5/2003 | Cohen |
| 2003/0120601 A1 | 6/2003 | Ouye et al. |
| 2003/0182290 A1 | 9/2003 | Parker |
| 2003/0191716 A1 | 10/2003 | Woods et al. |
| 2004/0024714 A1 | 2/2004 | Wells et al. |
| 2004/0034769 A1 | 2/2004 | Bacha |
| 2004/0093493 A1 | 5/2004 | Bisbee |
| 2004/0104266 A1 | 6/2004 | Bolle |
| 2004/0111619 A1 | 6/2004 | Laurie et al. |
| 2004/0193907 A1 | 9/2004 | Patanella |
| 2004/0210534 A1 | 10/2004 | Jackson et al. |
| 2005/0203885 A1 | 9/2005 | Chenevich et al. |
| 2006/0084414 A1 | 4/2006 | Alberth et al. |
| 2006/0085314 A1 | 4/2006 | Grim |
| 2006/0085344 A1 | 4/2006 | Grim et al. |
| 2006/0155863 A1 | 7/2006 | Schmidt |
| 2006/0235891 A1 | 10/2006 | Brown et al. |
| 2006/0271543 A1 | 11/2006 | Dodson et al. |
| 2006/0293925 A1 | 12/2006 | Flom |
| 2007/0036302 A1 | 2/2007 | Cho |
| 2007/0124241 A1 | 5/2007 | Newton |
| 2007/0150475 A1 | 6/2007 | Hamada |
| 2007/0168676 A1 | 7/2007 | Fayad et al. |
| 2007/0214365 A1 | 9/2007 | Cornett et al. |
| 2007/0226199 A1 | 9/2007 | Moore et al. |
| 2007/0274293 A1 | 11/2007 | Forbes |
| 2007/0282615 A1 | 12/2007 | Hamilton et al. |
| 2008/0016537 A1 | 1/2008 | Little et al. |
| 2008/0154774 A1 | 6/2008 | Dennison et al. |
| 2008/0233928 A1 | 9/2008 | Han et al. |
| 2008/0250480 A1 | 10/2008 | Meshkat |
| 2009/0025092 A1 | 1/2009 | Smith |
| 2010/0180348 A1 | 7/2010 | Dodson et al. |
| 2013/0191889 A1 | 7/2013 | Asghari-Kamrani |

OTHER PUBLICATIONS

Electronic Safety Deposit Box, http://www.whynot.net/view_idea?id= 1110, Why N?t, Electronic Safety Deposit Box, 2006.

eOriginal SmartSign® On Demand, http://www.eoriginal.com/products/ss_ondemand.html, eOriginal Products: SmartSign, 2006.

Information security for the extended enterprise, http://www.cyber-ark.com/datasecuritysoftware/index.asp?gclid=CMXUrsift4UCFTnJAodxCazzA, Cyber-Ark, 2006.

If You Lose All Your Data Today . . . Will You Still Be in Business Tomorrow? http://www.usdatatrust.com/landing/online-backup.asp, U.S. Data Trust: Online Data Backup. Services, 2006.

Keeping your data safe . . . keeps you in business, http://www.centraldatavault.com/index.htm, Central Data Vault, Online Backup Freed Trial, Computer Remote Backup, 2006.

Hasan et al., "Toward a Threat Model for Storage Systems," StorageSS 2005, Nov. 11, 2005, 9 pgs.

VeriSign, "Security Solutions in Support Compliance with the Gramm-Leach-Billey Act," 2003, 2 pgs.

\* cited by examiner

SYSTEMS AND METHODS FOR SECURE ONLINE REPOSITORIES

CROSS REFERENCE TO RELATED APPLICATIONS

This application is a continuation application of and claims priority to U.S. application Ser. No. 15/621,701, filed on Jun. 13, 2017, which is a continuation application of and claims priority to U.S. application Ser. No. 11/863,060, filed on Sep. 27, 2007, now U.S. Pat. No. 9,710,615, which are hereby incorporated by reference.

This application is related to the following commonly-assigned patent applications, the entire contents of which are hereby incorporated in this present application by reference:

U.S. patent application Ser. No. 11/450,008 filed Jun. 9, 2006, entitled "Systems and Methods for Secure On-line Repositories";

U.S. patent application Ser. No. 11/450,669, filed Jun. 9, 2006, entitled "Systems and Methods for Secure On-line Repositories";

U.S. patent application Ser. No. 11/450,014, filed Jun. 9, 2006, entitled "Systems and Methods for Secure On-line Repositories";

U.S. patent application Ser. No. 11/450,670, filed Jun. 9, 2006, entitled "Systems and Methods for Secure On-line Repositories";

U.S. patent application Ser. No. 11/450,673, filed Jun. 9, 2006, entitled "Systems and Methods for Multi-user Accessible Secure On-line Repositories";

U.S. patent application Ser. No. 11/450,671 filed Jun. 9, 2006, entitled "Systems and Methods for Multi-user Accessible Secure On-line Repositories";

U.S. patent application Ser. No. 11/450,675, filed Jun. 9, 2006, entitled "Systems and Methods for Electronic Delivery of Documents Using Secure On-line Repositories";

U.S. patent application Ser. No. 11/450,691 filed Jun. 9, 2006, entitled "Systems and Methods for Electronic Delivery of Documents Using Secure On-line Repositories";

U.S. patent application Ser. No. 11/450,674, filed Jun. 9, 2006, entitled "Systems and Methods for a Document Exchange Medium Using Secure On-line Repositories"; and U.S. patent application Ser. No. 11/450,428, filed Jun. 9, 2006, entitled "Systems and Methods for a Document Exchange Medium Using Secure On-line Repositories".

This application claims priority to the following commonly-assigned patent applications:

U.S. patent application Ser. No. 11/781,911, filed Jul. 23, 2007, entitled "Systems and Methods for Virtual Banking";

U.S. patent application Ser. No. 11/781,914, filed Jul. 23, 2007, entitled "Systems and Methods for Virtual Banking"; and U.S. patent application Ser. No. 11/863,040, filed Sep. 27, 2007, entitled "Systems and Methods for Secure On-line Repositories";

U.S. patent application Ser. No. 11/863,053, filed Sep. 27, 2007, entitled "Systems and Methods for Secure On-line Repositories";

U.S. patent application Ser. No. 11/863,064, filed Sep. 27, 2007, entitled "Systems and Methods for Secure On-line Repositories"; and U.S. patent application Ser. No. 11/863,128, filed Sep. 27, 2007, entitled "Systems and Methods for Secure On-line Repositories".

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007, USAA.

BACKGROUND OF THE INVENTION

Storage of important and/or personal records is often times desirable and needed. Safety deposit boxes, file cabinets, and so forth, have been used in the past to address this need. However, these storage mechanisms, especially in a digital context, fall short of providing centralized, personal, and secure document storage facilities, which result in something more than simple share-drive spaces. Thus, it would be advantageous to provide systems, methods, and other mechanisms for storing various records.

SUMMARY OF THE INVENTION

Systems, methods, and other mechanisms are disclosed herein for storing various records. By way of example and not limitation, in one aspect of the presently disclosed subject matter, various keys and various parties can access on-line repositories. In another aspect, these repositories contain a plurality of lockboxes, structured hierarchically and otherwise, providing public and private areas with varying levels of access. Some content of such lockboxes is sharable, while other content is not sharable. These lockboxes can be used to not only store diverse content, ranging from birth certificates, to deeds, and to social security numbers, but they can also be accessed in a variety of ways.

Again, by way of example and not limitation, keys to lockboxes can be made available by such events as the issuing of death certificates or birth certificates. Alternatively, keys can be issued according to various rules and heuristics stipulated by lockbox users (which may include lockbox owners). In either case, the plurality of lockboxes residing in repositories can be configured to provide centralized storage facilities that are secure and readily accessible from various computing devices.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended figures. In order to illustrate the present disclosure, various aspects thereof are shown. However, the disclosure is not limited to these specific aspects. The following figures are included.

DETAILED DESCRIPTION OF ILLUSTRATIVE EMBODIMENTS

Certain specific details are set forth in the following Detailed Description and figures in order to provide a thorough understanding of various aspects of the presently disclosed subject matter. Certain well-known details often associated with computing and software technology are not set forth in the following disclosure to avoid unnecessarily obscuring the various aspects in question. Further, those of ordinary skill in the relevant art will understand that they can practice other aspects of the presently disclosed subject matter without one or more of the details described below. Finally, while various methods are described with reference to certain steps and associated sequences, these steps and sequences of steps should not be taken as required to practice the claimed subject matter, but rather as illustrative of the exemplary and non-limiting nature of the present disclosure.

Secure On-Line Storage

A permanent, secure, online electronic repository can provide users (which may include enterprise members or customers) a place to store personal and/or important information, such as birth certificates, wills, deeds, etc., in electronic form. Uniquely, such storage can be provided by a bank or similar institution, and thus this storage can function as an electronic safety deposit box or a "virtual" deposit box (in other words, a "lockbox"). Features can include, for example, catalog functionality for easy management and retrieval, access control facilities for the "owner" to designate other individuals authorized for access, event-driven access (e.g., survivorship, etc.), dedicated privacy with a subset space for "shared" elements with the bank (provider), survivorship functionality with regard to disposition of contents, intelligent retention rules, and so on.

Figure 1:
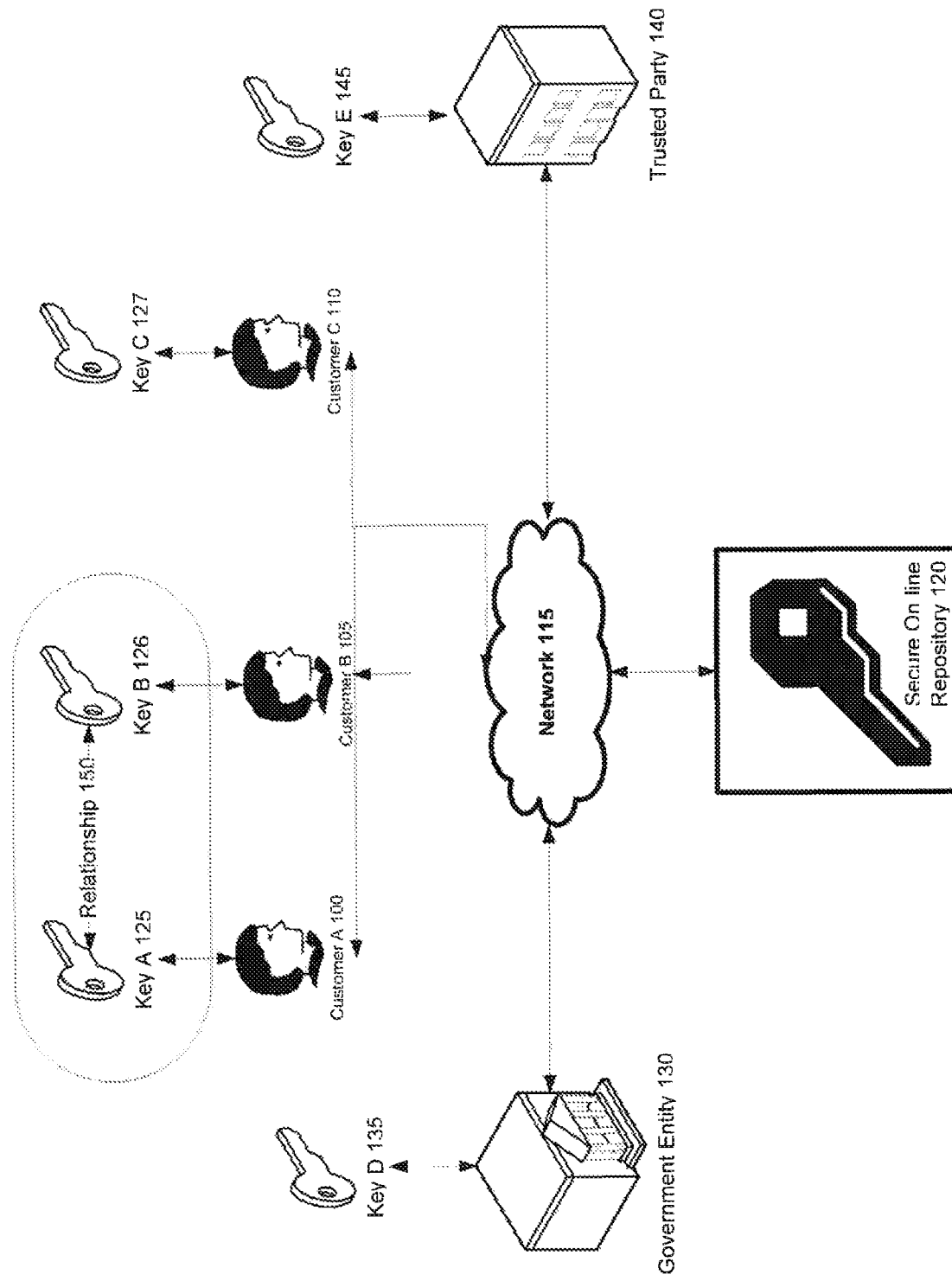
FIG. 1 is a diagram illustrating various aspects of online repositories, including entities involved in transacting with such repositories and associated access mechanisms.

Turning now to FIG. 1, various aspects of online repositories are shown, including the users involved in transacting with such repositories and the associated access mechanisms. By way of example and not limitation, a secure online repository 120 is shown that can be accessed via some network 115, such as a local area network (LAN), a wide area network (WAN), a wireless network, or a plain old telephone service (POTS). In one straightforward scenario, customer A 100 with a corresponding key A 125 can access the online repository 120 via the network 115. Upon access validation, this customer A 100 can edit, delete, add, view, etc., the contents of the online repository 120.

In another scenario, a subsystem of the online repository 120, such as a software module, or a hardware or firmware component (as discussed with reference to FIGS. 10 and 11), can be configured to receive a first key (e.g. Key A 125) and another subsystem of the online repository 120 can be configured to receive a second key (e.g. Key B 126), where the second key might be considered distinct from the first key by the online repository 120. Moreover, the second key can have some kind of a relationship to said first key. Thus, per FIG. 1, Key A 125 is distinct from Key B 126, yet a relationship 150 can exist between these Keys A 125 and B 126. By way of example, Key A 125 might have a mathematical relationship to Key B 126, if, for instance the latter key 126 is a derived function of the former key 125. If the Keys A 125 and B 126 are numbers, some cryptographic relationship might exist. However, the illustrated relationship 150 is not only between keys, but might be based on the relationship between users of the Keys A 125 and B 126. For example, a parent might own Key A 125 and a child might own Key B 126, and in this scenario no mathematical or otherwise logical relationship might exist between the Keys A 125 and B 126, yet these keys might be related because their owners or users are related. Of course, a combination of mathematical or bloodline relationships might exist in other aspects of the presently disclosed subject matter.

The various Keys A 125, B 126, C 127, D 135, E 145 shown in FIG. 1 can take various forms, whether it be online identifications, passwords, digital certificates, and so on. Furthermore, the various illustrated keys can be limited in access time to the online repository 120. In other words, such keys may be valid only for a predetermined amount of time (whether minutes, days, weeks, or years), and they may also be limited in the amount of access time they provide (e.g., allowing users to access the online repository 120 only for minutes or hours at a time—and thereafter timing out a log-on session).

Regarding issuance of such keys, they can be created by any one of (a) the online repository 120, (b) customers 100, 105, 110, 130, 140 of the online repository 120, and (c) trusted third parties 140. Once such keys are issued, they can be rendered void after a predetermined number of access attempts to said online repository 120. In other words, after users use the keys several times to access the online repository 120, they can be voided (i.e., they can be considered "worn-out") or they can be voided if they are used improperly (i.e., they can be considered "taken-way" from users). In the latter case, if a username is stolen and a nefarious entity tries to hack into the online repository 120 by trying different passwords, the username can be frozen or voided by the online repository 120.

In another aspect of the presently disclosed subject matter, FIG. 1 illustrates that trusted party 140 can also be involved in accessing the online repository 120. Thus, the online repository 120 can have module or component subsystems configured to receive a first access key (e.g., Key C 127) from a first party (e.g., customer C 110) and subsystem configured to receive a second access key (e.g., Key E 145) from a trusted party 140 trusted by an owner of the online repository 120. Furthermore, the online repository 120 can have still other subsystems (as discussed, for example, in FIGS. 10 and 11) configured to provide access to the online repository 120 only when both the first key, Key C 127, and said second key, Key E 145, are validated substantially at the same time.

The trusted parties can be banks, law firms, governmental agencies, suppliers of the online repository, and the like. For example, the second key, Key E 145, can become usable to access the online repository 120 following the issuance of a death certificate of the owner of the online repository 120. Such certificates can be issued by the appropriate governmental entity 130 (a local state, county, or city administration). Alternatively, Key E 145 can be rendered usable to access the online repository 120 following the issuance of a birth certificate of the Customer C 110. For example, upon issuance of a birth certificate, Customer C 110 can have access to any inheritance stored in the online repository 120.

In still other aspects of the presently disclosed subject matter, the Key E 145 can be configured to aid only in providing access to the online repository 120 for the Customer C 110, but not allow the trusted party 140 to inspect the contents of said online repository 120. For example, if the trusted party 140 is a law firm or a specific attorney, that attorney can provide the Key E 145 to the online repository 120 without having the privilege to inspect the contents of the online repository 120 (however, the alternative scenario is contemplated herein, where such trusted party 140 does have access to inspect the contents in question). Thus, it is also contemplated that access to the online repository 120 can be limited to only a portion of the online repository 120—per FIG. 2, for example, that illustrates a document exchange storage section 503 and a private document storage section 505).

In yet another aspect of FIG. 1, a requirement that both the Key C 127 and the Key E 145 need to be used to access the online repository 120 can be subject to an overwrite request by at least one party having an interest in said online repository 120. For example, the default position can be that both Keys C 127 and E 145 need to be used to access the online repository 120; however, if a sibling or child with some kind of relationship to the owner of the online repository 120 can make a colorable claim to the administrator of the online repository 120 that only one key (or a different key) should be used, this claim can be considered. Thus, the online repository 120 is flexible in maintaining access requests that are subject to various police and rules.

Figure 2:
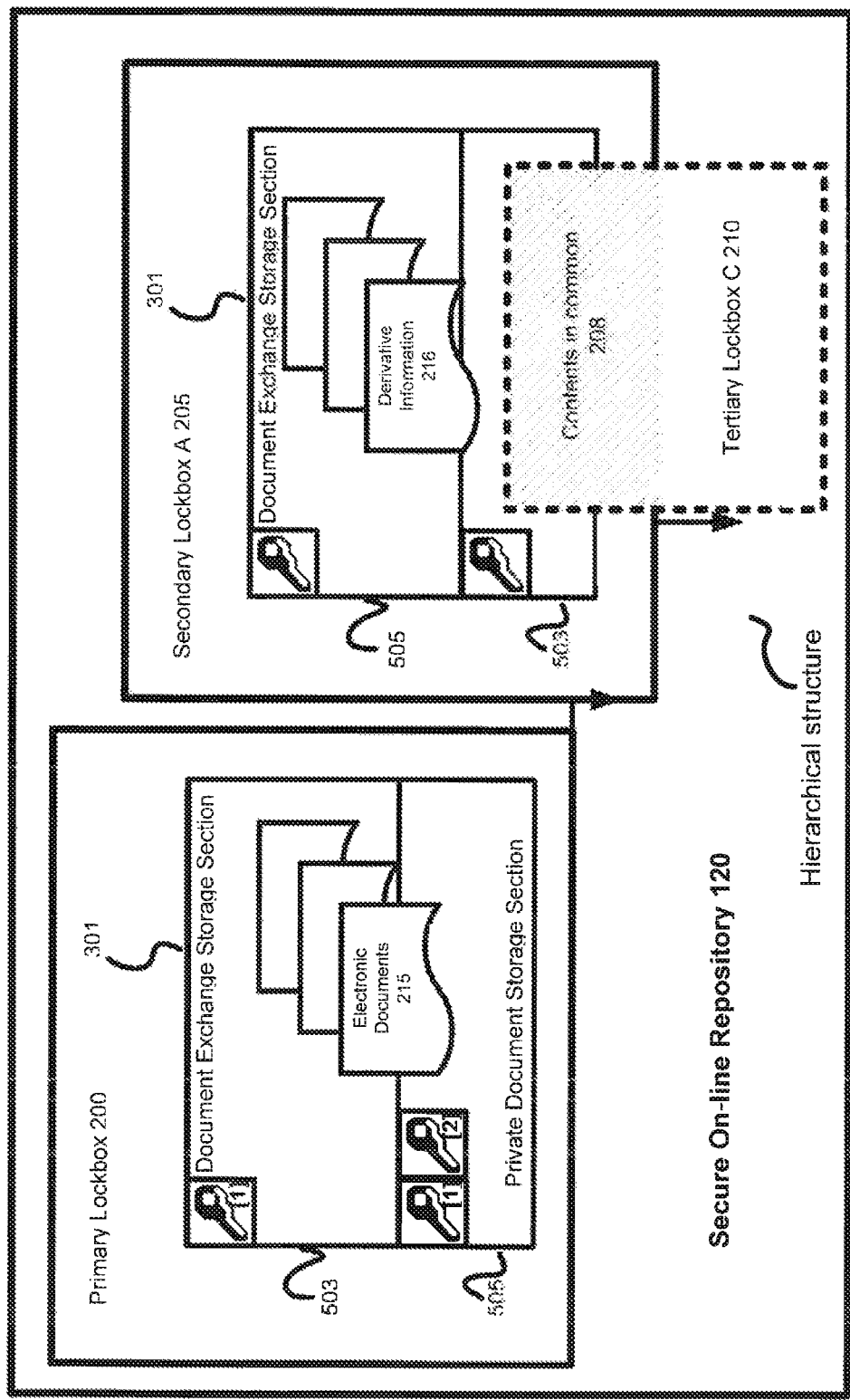
FIG. 2 is a diagram illustrating exemplary and non-limiting structural relationships between various components of online repositories.

Next, FIG. 2 illustrates the various exemplary and non-limiting structural relationships between various components of online repositories. By way of example and not limitation, the online repository 120 shown in FIG. 1 can have a subsystem configured to maintain a primary lockbox 200 accessible by a first user and a subsystem configured to maintain a secondary lockbox 205 accessible by a second user. It can also have a subsystem configured to provide access to the secondary lockbox 205 by the first user, and it can deny access to the primary lockbox 200 by the second user, thus introducing a kind of accessibility asymmetry among users. Moreover, the primary lockbox 200 and the secondary lockbox 205 can make up at least a portion of the overall online repository 120.

In one aspect of the presently disclosed subject matter, the online repository 120 can be configured to receive access grants given from a first user to a second user for the second user to gain access to the primary lockbox 200. The lockboxes 200, 205, 210 themselves may have various features, such as the primary lockbox 200 and the secondary lockbox 205 can be configured to dynamically change their data storage capacity depending on the amount of data in them; the primary lockbox 200 can intercept data intended for the secondary lockbox 205, and then, additionally, it can filter the intercepted data according to at least one predefined rule (e.g., forward only intercepted data from trusted parties or from known email or internet protocol addresses), and so on.

It should be noted that the primary lockbox 200 can be maintained by a separate entity from an entity maintaining the secondary lockbox 205. For example, the primary lockbox 200 can be maintained by one bank, while the secondary lockbox 205 can be maintained by another bank (or a different entity in kind, such as a governmental agency). Interestingly, the illustrated lockboxes 200, 205, 210 can have various relationships to each other, such as having a hierarchical structure (e.g., a filing system). They can also reside on various devices, be it stationary or mobile (it is contemplated that the primary lockbox 200 can reside on a server, while the secondary lockbox 205 can reside on a cell phone). Furthermore, these lockboxes 200, 205, 210 can store data in different formats, such as a stationary lockbox (i.e., stored on a server) using a standard format and the mobile lockbox (i.e., stored on a cell phone) using a more compressed format (given that mobile devices place a greater premium on storage size).

In yet another aspect of the presently disclosed subject matter, FIG. 2 also illustrates a system that is configured for the accessing of secure online repositories. In particular, the entire FIG. 2 illustration could be a user interface 213 subsystem, so that a user can access on a client computing device a remote online repository 120 (subsisting on another client computing device or a server computing device). Thus, per FIG. 2, a module or component subsystem could be configured to display on said user interface 213 a representation of a primary lockbox 200 inside said online repository 120. Moreover, another subsystem could be configured to display a public area 503 (e.g. a document exchange storage section) and a private area 505 (e.g. a private document exchange storage section) of the primary lockbox 200, where the 503 could require at least one key ([1]) to access contents in the public area 503, and the private area 505 could require at least two keys ([1] and [2]) to access contents in the private area 505. These keys could be provided by the same users, or a requirement could be put in place that they are to be provided by distinct users.

One aspect of the primary lockbox 200 is that it can represent its contents as stored in a hierarchical manner. Alternatively, contents can be stored in other ways also. By way of example and not limitation, the private area 505 can restrict any unsolicited data sent to it, and the public area 503 can accepts any data sent to it. However, the public area 503 can contain filters to screen incoming data. In some aspects, contents in the private area 505 can at least partially derive from contents stored in the public area 503. For instance, if contents in the public area 503 are mortgage contracts, certain information of interest, such as the social security number of individuals on the mortgage contracts, the price to be paid for the subject matter of the contracts, and so on, may be derived from the public area 503 and stored in the private area 505 for later consumption. In still other aspects, both areas 503, 505 can be related in some ways, such as having at least one public key in common, thereby, for example, relieving users from having to remember too many keys.

In another aspect of the presently disclosed subject matter, FIG. 2 illustrates that a subsystem can be configured to provide a secondary lockbox 205, and a subsystem can be configured to provide a tertiary lockbox 210, where the secondary lockbox 205 and the tertiary lockbox 210 can share a set of content in common 208. Moreover, another subsystem can be configured to provide access to the set of content in common 208 using a key of an owner of the secondary lockbox 205 or a key of an owner of the tertiary lockbox 210.

In particular, the set of content in common 208 can correspond to one of (a) document exchange storage section 505 of the secondary lockbox 205 and the tertiary lockbox 210 and (b) the private document storage section 503 of the secondary lockbox 205 and the tertiary lockbox 210. Alternatively, the set of content in common 208 can correspond to a public area of the secondary lockbox 505 and a private area (not shown) of the tertiary lockbox 210. In one aspect, the set of content in common 208 can persist only during a period that a user of the secondary lockbox 205 and a user of the tertiary lockbox C 210 are accessing their respective lockboxes (e.g., during the time period when both parties are logged on). In some implementations, the set of content in common 208 can be changed only by a user of said secondary lockbox 205 (and so the other user would have read-only access to the content in common 208).

The content in common 208 can be representative of content unique to each user of the secondary lockbox 205 and the tertiary lockbox 210. This is interesting in that users can use the content in common 208 to exchange or share information they don't have. For instance, a user of the secondary lockbox 205 can have (1) a social security number and (2) a work address; a user of the tertiary lockbox C 210 can have (1) a driver's license number and (2) the same work address as the other user. In order not to duplicate exchange of information, namely the work address, users can put the social security number and the driver's license number in the content in common 208 so that both parties can share in the unique information of the other party. Of course, various other information-sharing paradigms are contemplated herein. For instance, the content in common 208 can be accessible by a third party to a user of the secondary lockbox 205 and a user of the tertiary lockbox 210. The third party may be some arbitrator or intermediary between such users, having strictly defined access to the contents in common 208 by either or both users (or by the third party itself or still by some other party).

Figure 3:
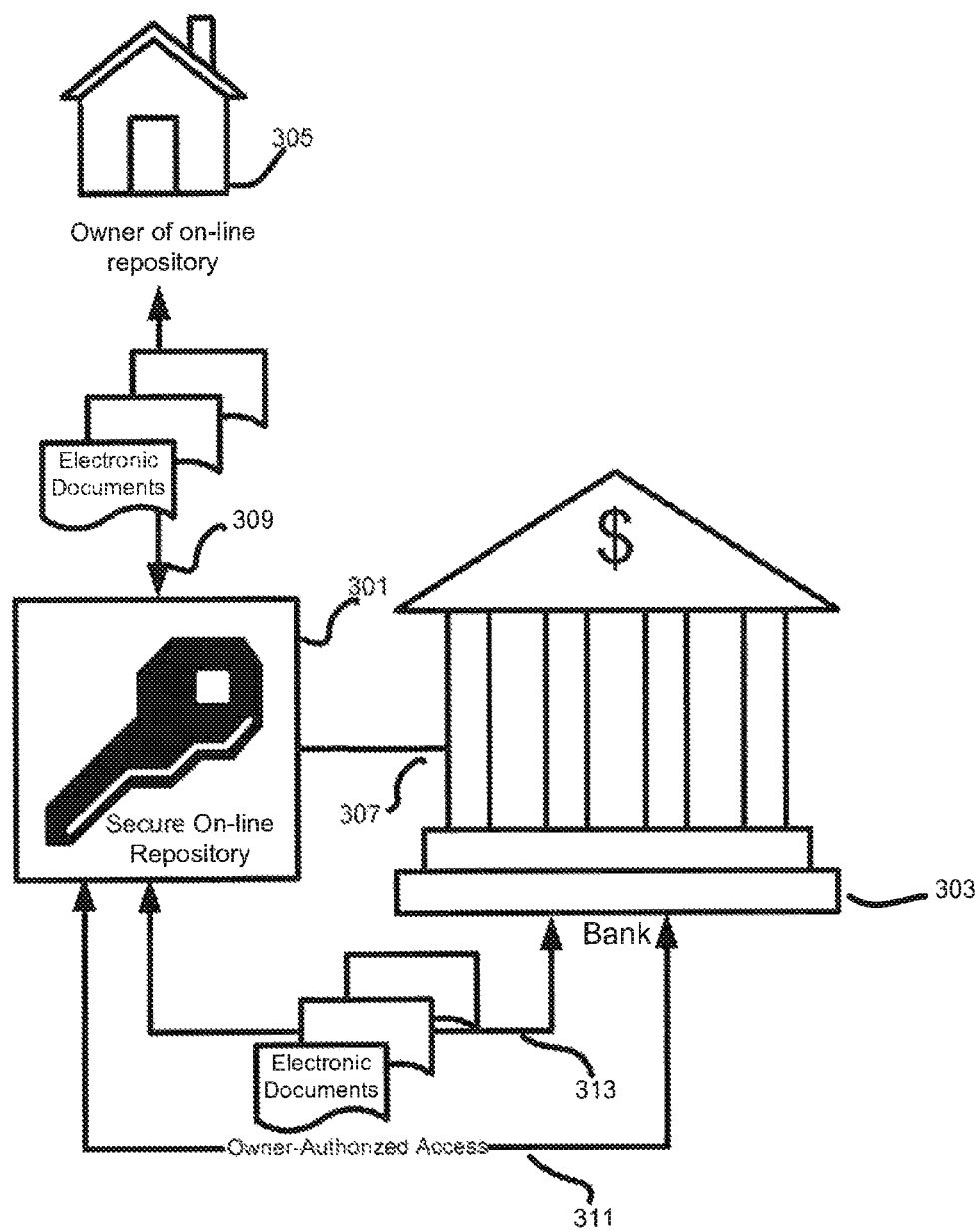
FIG. 3 is a diagram illustrating an example of a secure online repository system.

Next, referring to FIG. 3, a diagram is shown illustrating yet another exemplary and non-limiting aspect of a secure online repository system. Security and data protection for the online repository 301 (which may be a repository similar to that of the repository shown in FIGS. 1 and 2, namely repository 120) can be provided by an institution, such as a bank 303, that has the technology in place to provide enhanced security, survivability, and compliance with the many regulatory controls associated with banks and other financial institutions. The bank 303 can apply the same plurality of layers of security that it employs over its own records to the owner's 305 online repository 301. The bank 303, however, need not be a bank, but can be one that provides a similar level of security and reliability of a bank such as that described above. The bank 303 can provide such security, for example, in part by having a level of physical access control as well as network access control 307 over the storage devices on which the online repository 301 resides. Examples of storage devices include but are not limited to: computer hard drives, optical discs, solid state memory, removable media, and others described above with respect to the exemplary computer systems discussed below.

The bank 303 can register an owner 305 of the online repository 301 (for a fee or as a free service), and provides secure access 309 to the online repository 301 for that owner 305. As a private online repository, the documents stored within the online repository 301 could be accessible only to the registered owner 305, unless permission is given to other users of the system. In some aspects, even the bank 303 could be denied access to views, edits, and/or deletes associated with the documents, absent permission from the owner 305 or a legal mandate. Access can be provided such that the owner 305 can perform a variety operations and tasks with respect to the online repository 301 including, but not limited to: storing, sharing, copying, and viewing electronic documents; defining and setting attributes, properties, or permissions of stored electronic documents; editing and saving electronic documents; setting pre-defined rules for automatic actions to be taken on electronic documents; moving documents from one section of the repository to another; and deleting or destroying electronic documents stored within the online repository 301. For example, the owner 305 can also authorize 311 the bank 303 to deliver bank documents 313 (e.g., bank statements) to the owner 305 via the online repository 301 rather than emailing or mailing them.

Granting Others Access

Figure 4:
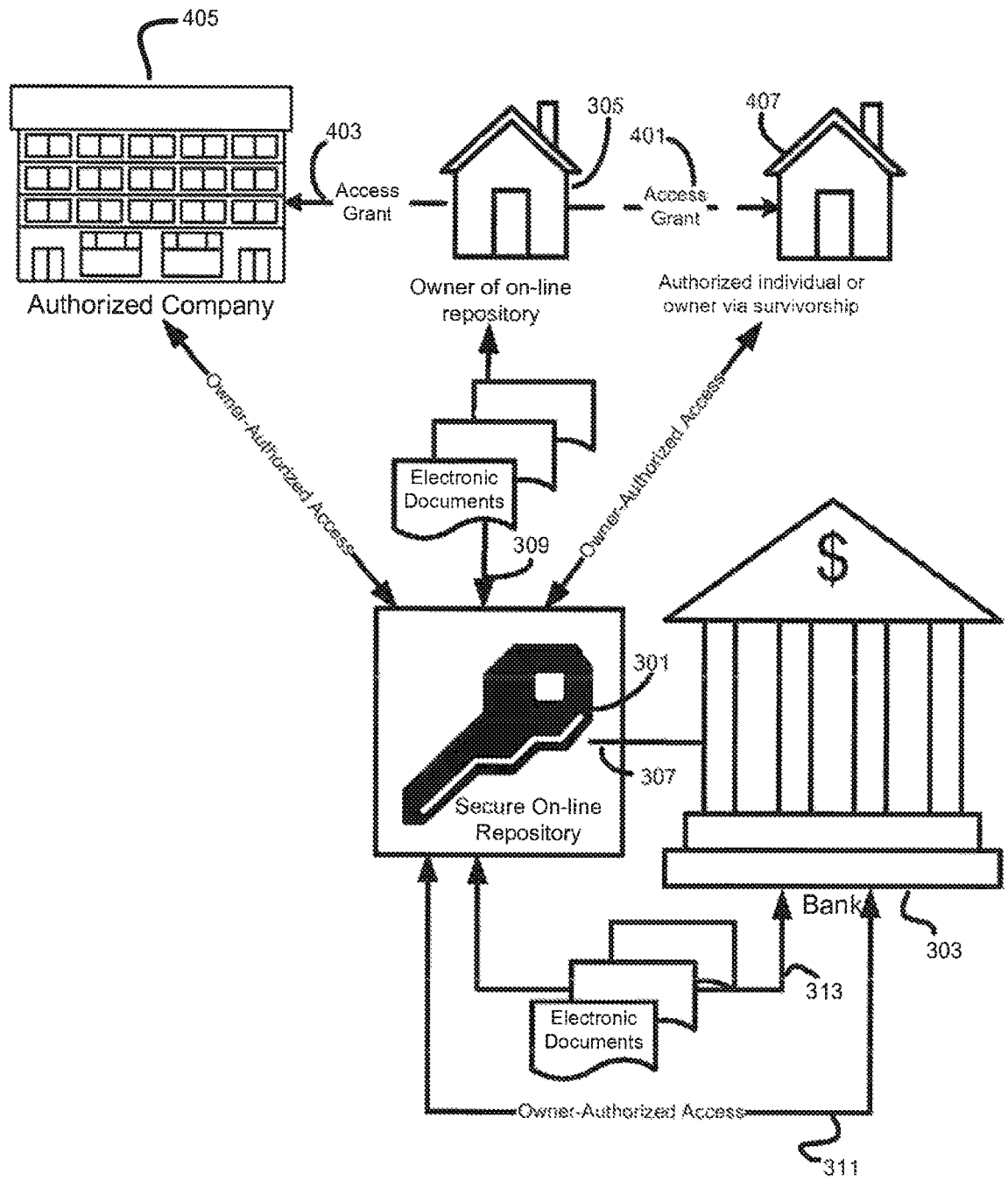
FIG. 4 is a diagram illustrating an example of a secure online repository system where access grants can be given to users other than the owner of the repository.

Referring next to FIG. 4, a diagram is shown illustrating an example of a secure online repository system where access grants may be given to others than the owner of the repository. As shown in the example of FIG. 4, an access grant 403 can be given by the owner 305 to authorized company 405, and an access grant 401 can also be given to an authorized individual 407. This enables the authorized company 405 and the authorized individual 407 to access the online repository 301 of the owner 305. When the authorized company 405, for example, requests access to the online repository 301, authentication will take place via the online repository 301 and network access control 307 put in place by the bank 303 in order to verify that the authorized company 405 is that to which the owner 305 gave the access grant 403. This may be, for example, a password, a digital certificate, or any authentication mechanism given by the owner 305 to the authorized company 405, which is then verified using the online repository 301 and network access control 307 provided by the bank 303.

The owner 305 can also provide certain access restrictions (or less than full access grants) to an authorized individual 407 or company 405 with respect to particular documents stored within the online repository 301 of the owner 305. These could be, for example, access to view a document, but not to print, copy, etc. When a particular authorized individual 407 or company 405 attempts to access a document in the online repository 301, the access grant 401 for that authorized individual 407, or access grant 403 for authorized company 405, can be checked and verified on a per-document basis, per-subject matter basis, or according to any standard applicable to a document or a set of documents. Such checking verifying can be performed by various components, either associated with the repository 301 or other parties.

Figure 5:
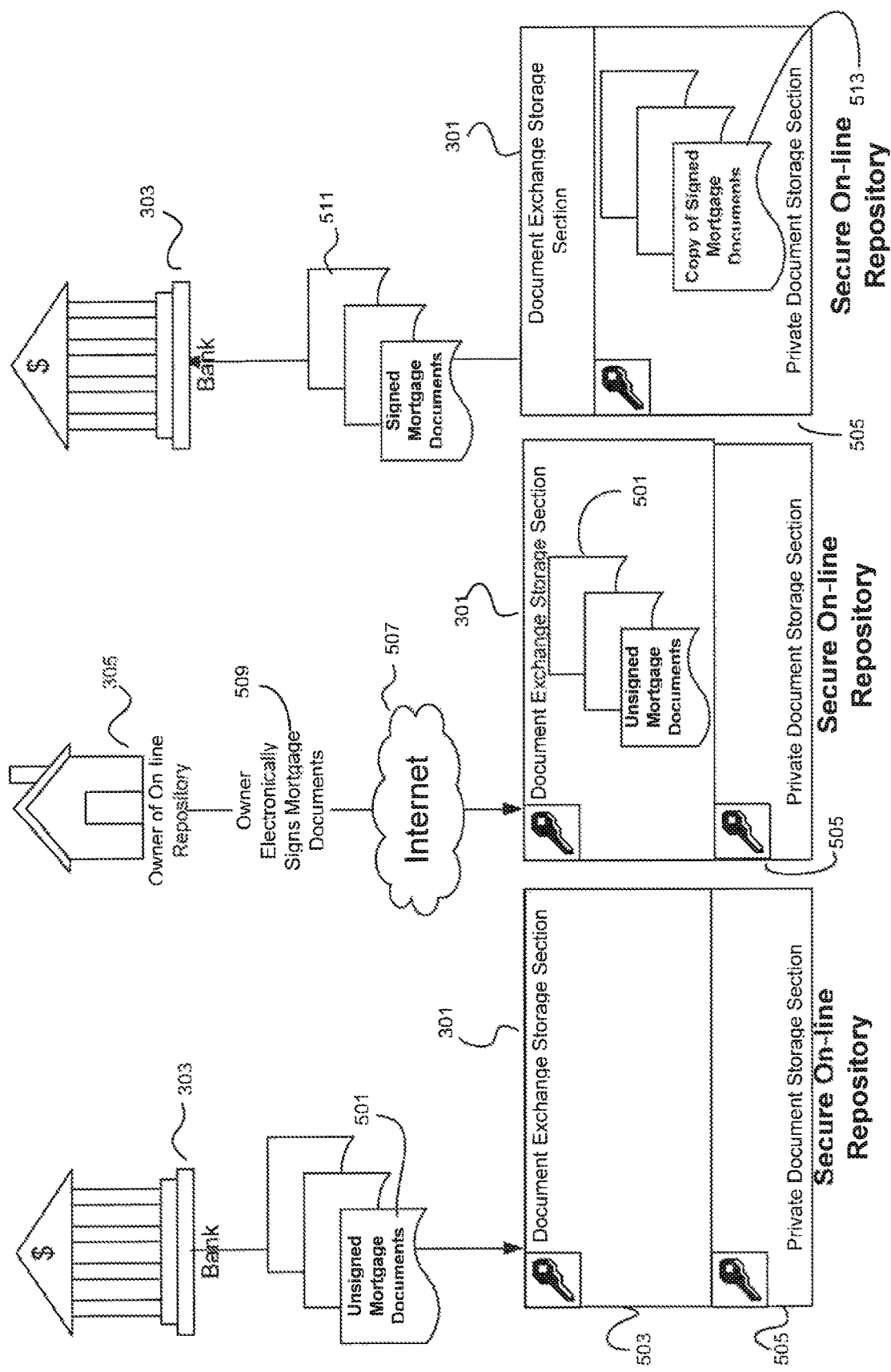
FIG. 5 is a diagram illustrating an example of a document exchange/document delivery process involving the secure online repository system.

Referring next to FIG. 5, a systematic use of the online repository 301 is shown as a document-exchange medium for documents 501. The system can feature a true two-way flow (as opposed to the one-way flow of document delivery). For example, regarding a mortgage, the bank 303 can deliver documents 501 to a customer's secure online repository 301 in a document exchange storage section 503 of that online repository 301 set aside for this purpose (or a related purpose). This document exchange storage section 503 could be a logical section delineated from the private document storage section 505 of the online repository 301

(by having a different accessibility set than that of the private document storage section 505). This can be done in order to provide higher security to those personal documents stored in the private document storage section 505. Moreover, the bank 303 or any other institution can have limited access to the document exchange storage section 503 when delivering to and/or receiving specific documents from the online repository 301 authorized by the owner 305.

For instance, delivered unsigned mortgage documents 501 can then be executed 509 by the owner 305 (or some other authorized user) over the Internet 507 using an e-signature or digital signature, for example. An e-signature or digital signature can be an electronic signature that can be used to authenticate the identity of the sender of a message or the signer of a document, and possibly to ensure that the original content of the message or document that has been sent is unchanged. Moreover, digital signatures can be easily transportable and automatically time-stamped. The ability to ensure that the original signed message arrives means that the sender cannot easily repudiate it later. An e-signature or digital signature can be used with any kind of message, whether it is encrypted or not, simply so that the receiver can be sure of the sender's identity and that the message arrived intact. This way of signing documents is particularly appropriate for use in conjunction with official or business documents received in the secure online repository 301, because it provides for completely secure paperless transactions.

Once electronically signed, the signed documents 511 are pulled from the online repository 301 by the bank 303. A copy of the signed documents 513 may optionally be left for the owner 305 to retain in the private document storage section 505. Note that the bank 303 need not be the same institution that is providing the secure online repository 301, but may be any individual, institution or company to which the owner 305 grants access to the document exchange storage section 503. Also, the documents exchanged may be of any type. For example, other business documents, contracts, certificates, photos and digital video may all be shared via the document exchange storage section 503.

For documents delivered to the online repository 301, predefined actions may be set to occur when, or sometime after, a document is delivered. These actions, for example, may include one or more of, but are not limited to: an electronic notification, an email notification, a notification by telephone, setting an access restriction or grant regarding the repository or a delivered document, forwarding of a delivered document, removing a delivered document from the repository, a reorganization of data within the repository, setting of a retention policy for a delivered document, electronic signature of a delivered document, categorization of a delivered document, opening of a delivered document, changing of a delivered document's attributes or properties, or performing an optical character recognition process on a delivered document. The above pre-defined actions may also be set to occur based upon a number of additional criteria regarding the delivered document(s) or other criteria. These criteria, for example, may include, but are not limited to: type of the document, sender of the document, whether there is a copy of the document already in the repository, whether the document is found on a pre-defined list of documents, whether the document is electronically signed, whether there is a retention policy set for the document, the date of the document, and an attribute or a property of the document.

Figure 6:
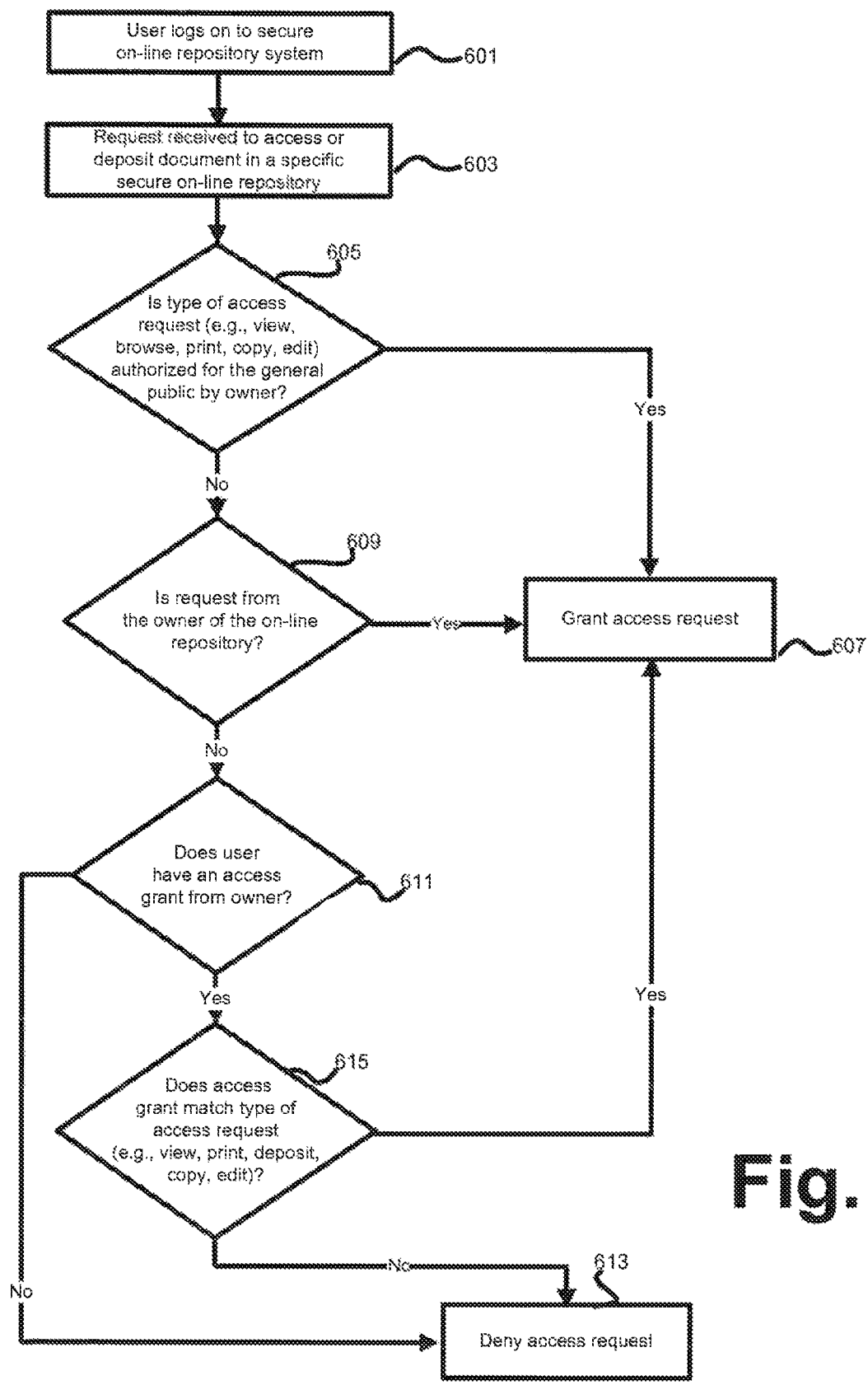
FIG. 6 is a flow chart diagram illustrating an example process for providing owners and others access to a secure online repository.

Referring next to FIG. 6, shown is a flow chart diagram illustrating an example process for providing owners and others access to a secure online repository. There are a variety of ways to provide access to individuals other than a single owner of a repository. These include, for example, the owner granting access rights to others as described above with respect to FIG. 4. Also, there can be repositories that are shared or co-owned by a number of individuals, with each co-owner setting access rights on their particular documents within the repository.

In the example process shown in FIG. 6, the secure online repository can be owned by a single individual and access rights can be granted to users who are then able to log on to a common system to authenticate their identity, as in operation 601. A request can then be received in operation 603 to access or deposit a document in a specific secure online repository. It can then be determined in operation 605 by a system (e.g. made of components shown with reference to FIGS. 10 and 11) whether the type of access request (e.g., view, browse, print, copy, edit) is authorized by the owner of the repository for the general public. If so, the access request can be granted, in operation 607, for that repository, or that document within that repository. If not, it can then be determined, in operation 609, by the system whether the request is from the owner of the online repository to which access is requested. If so, the access request can also be granted, as in operation 607. If not, it is then determined in operation 611 by the system whether the user has an access grant from the owner. If not, then the access request is denied in operation 613. If the user does have an access grant, it is determined in operation 615 by the system whether the access grant matches the type of access request (e.g., browse repository, view, print, deposit, copy, edit document). If the user's access grant does match the type of access request, then the access request is granted by the system. If not, then it is denied in operation 613.

Figure 7:
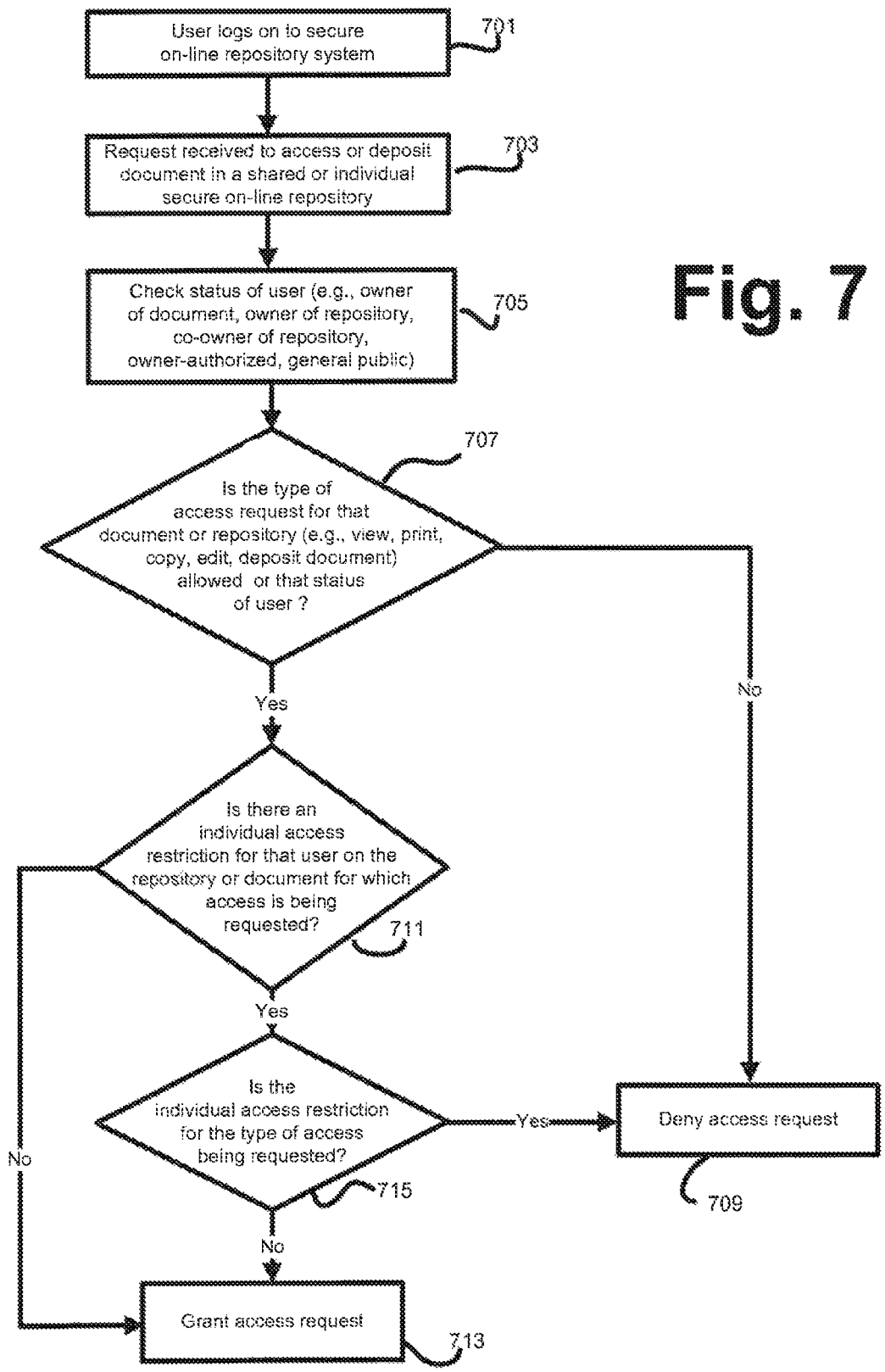
FIG. 7 is a flowchart diagram illustrating another example process for providing owners and others access to a secure online repository, including shared online repositories.

Referring next to FIG. 7, shown is a flow chart diagram illustrating another example process for providing owners and others access to a secure online repository, including shared online repositories. The example process shown in FIG. 7 accounts for the secure repository being owned by a single individual or shared (co-owned) by multiple individuals, and access rights are granted to users who are then able to log on to a common system to authenticate their identity, as in operation 701. First, an access request can be received, in operation 703, by the system to access or deposit a document in a shared or individual secure online repository. It can then be determined, in operation 705, whether the type of access request for that document or repository (e.g., view, print, copy, edit, browse, deposit document) is allowed for that status of user. This status may include, for example, being a co-owner of the repository, a sole owner of repository, or an authorized user of repository. The accesses that are allowed for each status of user may be set by the sole owner of the repository, sole owner of a document within a repository, co-owners of a repository collectively, or by default settings associated with the system. If the type of access request for that document or repository (e.g., view, print, copy, edit, browse, deposit document) is not allowed for that status of user, then the access request can be denied in operation 709. If it is allowed, then it can be determined, in operation 711 whether there is an individual access restriction for that user on the repository or document for which access is being requested. If not, then the access request can be granted in operation 713. If there is an individual access restriction for that user, then it can be determined, in operation 715, whether the individual access restriction applies to the type of access being requested. If it does, then the access request can be denied in operation 709; otherwise, it is granted in operation 713.

Event Driven Access

Figure 8:
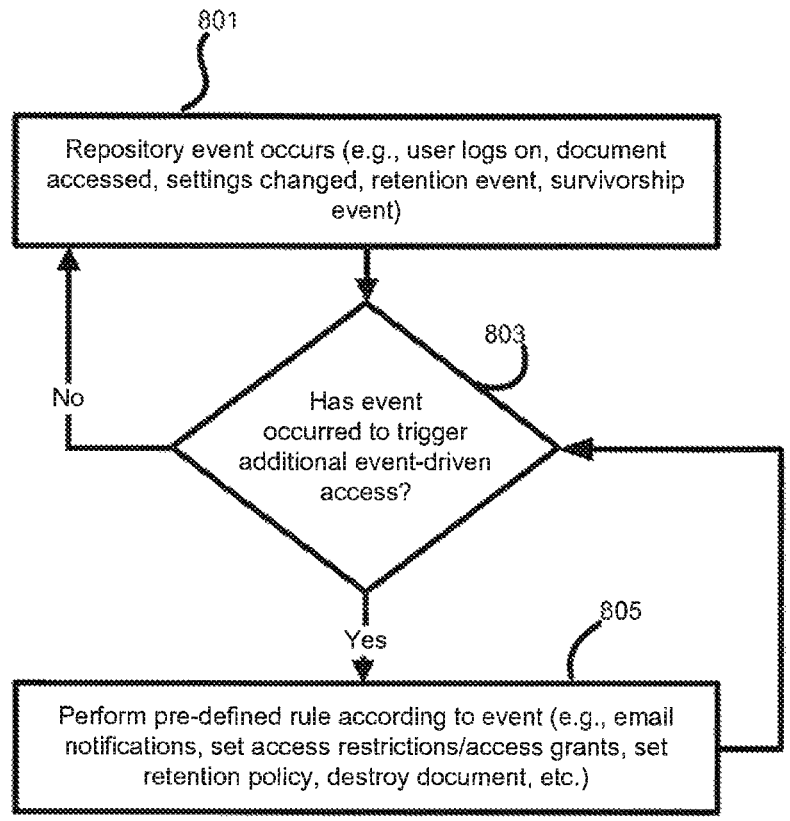
FIG. 8 is a flow chart diagram illustrating an example process for automatically processing documents in the repository triggered by certain events.

Referring next to FIG. 8, shown is a flow chart diagram illustrating an example process for automatically processing documents in the repository triggered by certain events. Certain events, such as the owner of the repository logging in, documents within the repository being accessed, settings changed, retention events, survivorship events, etc. may be set to trigger particular accesses to the documents corresponding to the event that occurred. These may be set directly by the owner of the repository over the Internet, or by the bank that is providing the repository according to written directives given by the owner. For example, an owner can set up the system so that all the contents of the repository go to his successor upon the owner's death. A survivorship setting can be activated to automatically transfer the ownership of the repository or deliver the contents of the repository to the son, upon official notification of the owner's death. Or, the owner may wish to set a retention policy that certain documents within the repository are to be destroyed after a chosen number of years. When the chosen number of years has passed, this can automatically trigger those particular documents to be deleted or otherwise destroyed After a repository event occurs in operation 801, it can be determined, in operation 803, whether this event has any automatic actions associated with it as set by pre-defined rules of the owner. If so, then the pre-defined rule can be followed in operation 805 according to the event that occurred (e.g., email notifications, set access restrictions/access grants, set retention policy, destroy document, etc.). If not, then the process can loop back to the beginning until another event occurs as in operation 801.

Example Underlying Architecture

Figure 9:
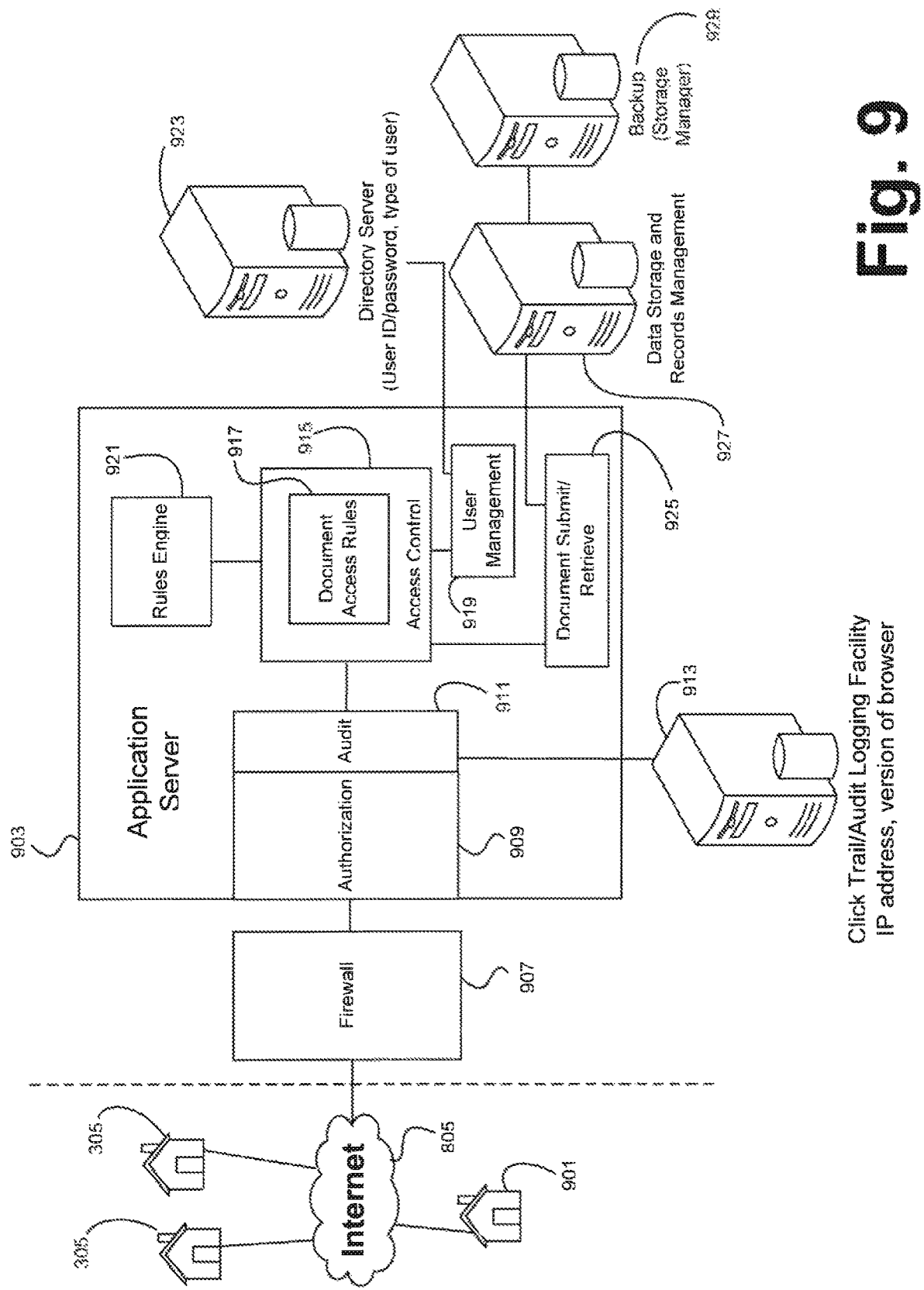
FIG. 9 is a diagram illustrating an example architecture for a system suitable for implementing secure online repositories according to the various figures illustrated and discussed herein.

Referring next to FIG. 9, a diagram is shown illustrating an example architecture for a system suitable for implementing secure online repositories according to the various figures disclosed herein. Secure online repository owners 305 and authorized users 901 can access an application server 903 over a computer network such as intranet or the Internet 805, for example, through a firewall 907. The firewall 907 can be a set of related programs, located at a network gateway server, that protects the resources of the private network on which the secure repositories reside by enforcing security policies. For example, the firewall 907 can verify the owners 305 and authorized users 901 before they are allowed access to the private network by way of a user ID, password, or IP address (or some combination thereof).

Once the firewall 907 is passed and user authentication 909 is complete, the auditing component 911 can start to store audit information, such as the web pages the repository owners 305 or authorized users 901 have visited (click trail), IP address, version of owner 305's or user 901's browser, etc., in the click trail logging facility 913. The access control component 915, in communication with the authentication component 909 and user management component 919, can provide authentication information such as user ID and password from the directory server 923 for authentication purposes. The access control component 915 can also control what type of access and to what resources and repositories the repository owners 305 or authorized users 901 are allowed access. Access can be based on the document access rules 917 consumed by and being executed on the rules engine component 921 in communication with the access control component 915. If the repository owners 305 or authorized users 901 are allowed such access as requested, then the data can be provided through the document submit/retrieve component 925. The document submit/retrieve component 925 can be in communication with the actual, physical data storage facilities 927 and 929 on which the secure online repositories reside, and manage the transfer of the data between the storage facilities 927 and 929 and the application server 903. The data residing on the data storage and records management facility 927 can be backed up according to the records management policies and regulations associated with financial and other highly regulated institutions. One example of a backup system with capabilities suitable for implementing such data storage standards is a storage manager 929, but other suitable backup systems may be used as well.

Exemplary Computing and Networking Environment

Figure 10:
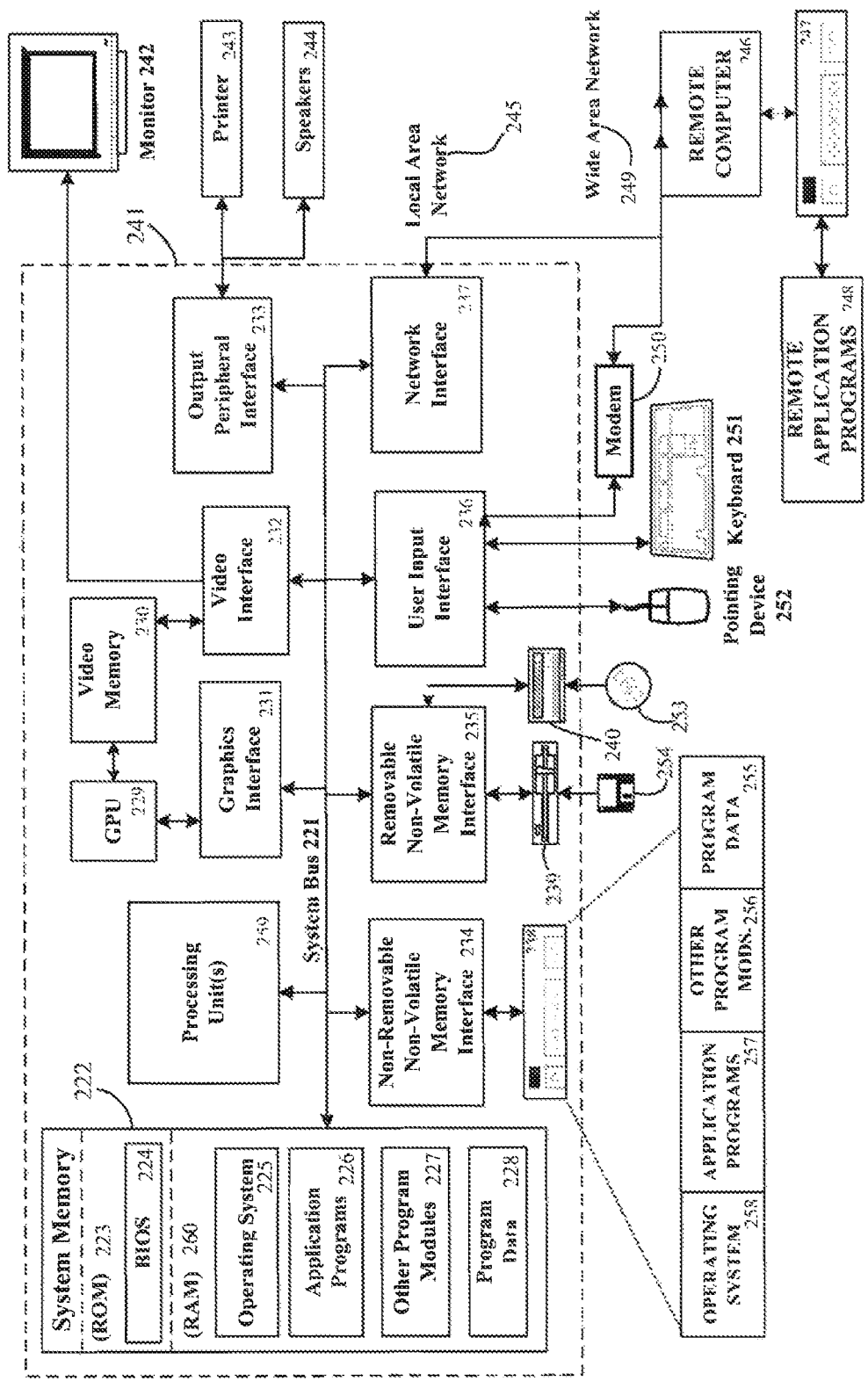
FIG. 10 is a diagram illustrating an exemplary computing environment which may be used in conjunction with the various aspects disclosed herein.

Referring to FIG. 10, shown is a block diagram representing an exemplary computing environment suitable for use in conjunction with implementing the systems, methods, and computer-readable media described above. For example, computer-executable instructions are provided that carry out the processes and methods for secure online repositories. They may reside and/or be executed in such a computing environment 220 as shown in FIG. 10. The computing environment 220 is only one example of a suitable computing environment and is not intended to suggest any limitation as to the scope of use or functionality of the presently disclosed subject matter. Neither should the computing environment 220 be interpreted as having any dependency or requirement relating to any one component or a combination of components illustrated in the exemplary computing environment 220.

Aspects of the presently disclosed subject matter are operational with numerous other general purpose or special purpose computing systems, environments, or configurations. Examples of well known computing systems, environments, and/or configurations that may be suitable for use with the this subject matter include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 241. Components of computer 241 may include, but are not limited to, a processing unit 259, a system memory 222, a graphics processing unit (GPU) 229 (and a graphics interface 231), a video memory 230 (and a video interface 232), and a system bus 221 that couples various system components, including the system memory 222 to the processing unit 259. The system bus 221 may be any of several types of bus structures, including a memory bus or memory controller, a peripheral bus, and a local bus using any of a variety of bus architectures. By way of example and not limitation, such architectures include Industry Standard Architecture (ISA) bus, Micro Channel Architecture (MCA) bus, Enhanced ISA (ESA) bus, Video Electronics Standards Association (VESA) local bus, and Peripheral Component Interconnect (PCI) bus (also known as Mezzanine bus).

Computer 241 typically includes a variety of computer-readable media. Computer-readable media can be any available media that can be accessed by computer 241, and includes both volatile and nonvolatile media, removable and non-removable media. By way of example and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, random access memory (RAM), read-only memory (ROM), electronically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and that can be accessed by computer 241.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared and other wireless media. Combinations of any of the above should also be included within the scope of computer-readable media.

The system memory 222 includes computer storage media in the form of volatile and/or nonvolatile memory such as read only memory (ROM) 223 and random access memory (RAM) 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example and not limitation, FIG. 10 illustrates operating system 225, application programs 226, other program modules 227, and program data 228.

The computer 241 may also include other removable/non-removable, volatile/nonvolatile computer storage media. By way of example only, FIG. 10 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable, non-volatile memory interface such as interface 234, and magnetic disk drive 239 and optical disk drive 240 are typically connected to the system bus 221 by a removable, non-volatile memory interface, such as interface 235.

The drives and their associated computer storage media discussed above and illustrated in FIG. 10 provide storage of computer-readable instructions, data structures, program modules, and other data for the computer 241. In FIG. 10, for example, hard disk drive 238 is illustrated as storing operating system 258, application programs 257, other program modules 256, and program data 255. Note that these components can be either the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball, or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port, or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device, or other common network node, and typically includes many or all of the elements described above relative to the computer 241, although only a memory storage device 247 has been illustrated in FIG. 10. The logical connections depicted in FIG. 10 include a local area network (LAN) 245 and a wide area network (WAN) 249, but may also include other networks. Such networking environments are commonplace in offices, enterprise-wide computer networks, intranets, and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example and not limitation, FIG. 10 illustrates remote application programs 248 as residing on memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and may be combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 10, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 11:
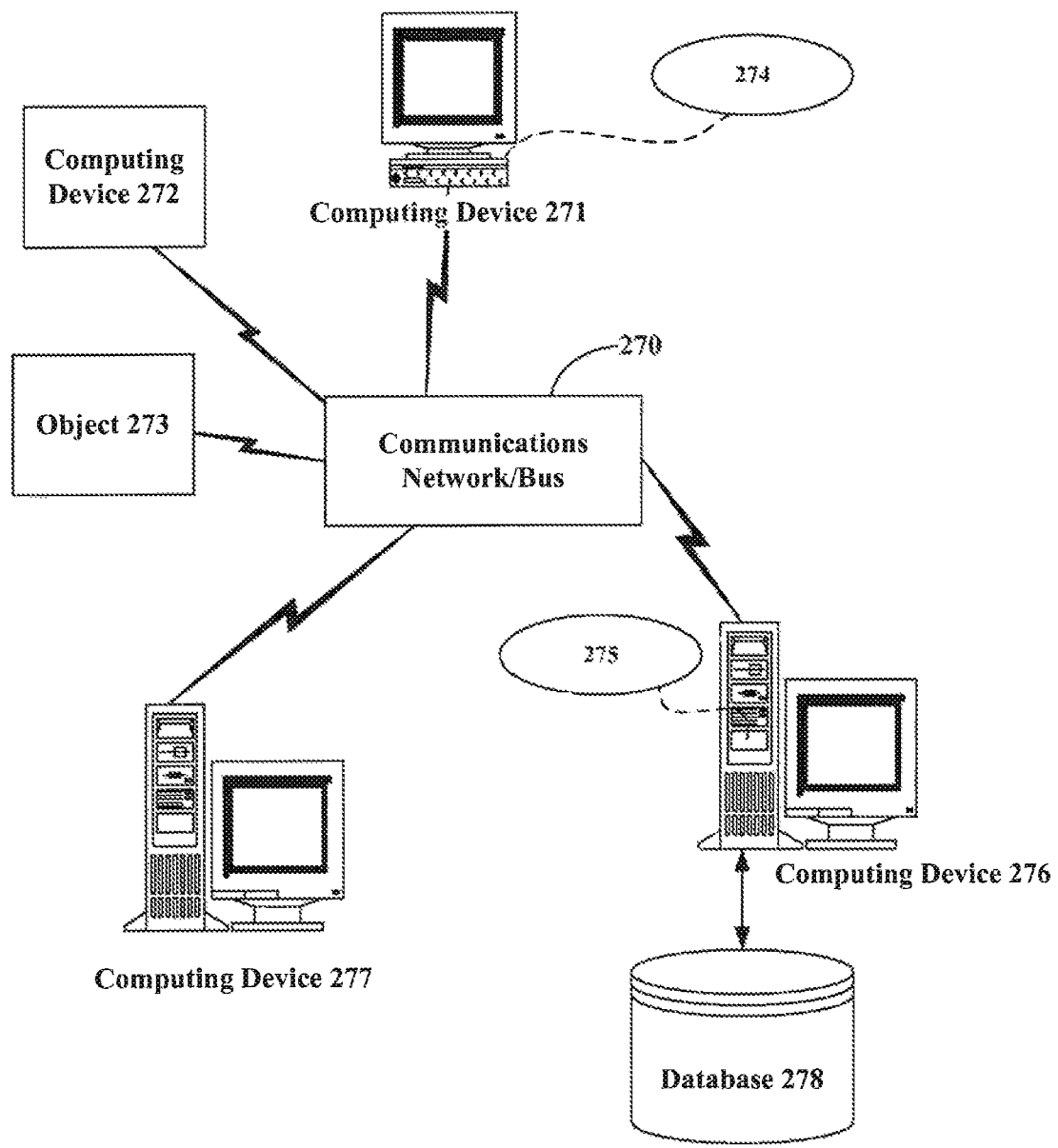
FIG. 11 is a diagram illustrating an exemplary networking environment which may be used in conjunction with the various aspects disclosed herein.

Referring next to FIG. 11, shown is an exemplary networked computing environment in which many computerized processes may be implemented to perform the processes described above. For example, parallel computing may be part of such a networked environment, with various clients on the network of FIG. 11 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects, or resources that may use the processes described herein.

FIG. 11 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, various entities may be responsible for the maintenance and updating of a database 278 or other storage element.

This network 270 may itself comprise other computing entities that provide services to the system of FIG. 11, and may itself represent multiple interconnected networks. In accordance with an aspect of the presently disclosed subject matter, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 11, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, the two computer systems communicating with one another over a communications medium, thus providing distributed functionality and allowing multiple clients to take advantage of the informationgathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 11 and the further diversification that can occur in computing in a network environment such as that of FIG. 11, the systems, methods, and computer readable media provided herein cannot be construed as limited in any way to a particular computing architecture or operating system. Instead, the presently disclosed subject matter should not be limited to any single embodiment, but rather should be construed in breadth and scope in accordance with the appended claims.

Lastly, while the present disclosure has been described in connection with the exemplary and non-limiting aspects of the disclosed subject matter, as illustrated in the various figures, it is understood that other similar aspects may be used or modifications and additions may be made to the described aspects for performing the same function of the present disclosure without deviating therefrom. For example, in various aspects of the disclosure, processes and methods were described for secure online repositories. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for providing access control to a repository, comprising:
   a computer network;
   at least one database configured to store the repository, the at least one database being connected to the computer network and the repository including a first lockbox and a second lockbox;
   a computing device connected to the computer network and the database, the computing device comprising at least one processor and a non-transitory computer-readable storage medium encoded with a computer program comprising instructions that, when executed, cause the at least one processor to:
      receive, from a user interface of a first client device, a first access key from a first party;
      receive, from a user interface of a second client device, a second access key from a second party, the second party being different from the first party;
      validate the first access key and the second access key;
      in response to validating both the first and second access keys, provide remote access to the first lockbox to the first party and remote access to the second lockbox to the second party over the computer network, wherein the first lockbox and the second lockbox share content in common that includes information unique to the first party and information unique to the second party; and
      responsive to the provided remote access, provide, through the computer network, the content in common to the first client device and the second client device, wherein the information unique to the first party is concurrently available on the user interface of the second client device for the duration the first party is remotely accessing the first lockbox and the information unique to the second party is concurrently available on the user interface of the first client device for the duration the second party is remotely accessing the second lockbox.

2. The system of claim 1, wherein the instructions further comprise instructions that, when executed, cause the at least one processor to provide remote access to the second lockbox of the repository to the second party using the validated second access key in response to receiving an issuance of a death certificate of an owner of the repository.

3. The system of claim 1, wherein the instructions further comprise instructions that, when executed, cause the at least one processor to provide remote access to the second lockbox of the repository to the second party using the validated second access key in response to receiving an issuance of a birth certificate of the first party.

4. The system of claim 1, wherein the second party is one of (a) a governmental entity, (b) a supplier of the repository, and (c) a professional individual associated with an owner of the repository.

5. The system of claim 1, wherein a requirement that both the first access key and the second access key need to be validated is subject to an overwrite request by at least one party having an interest in the repository.

6. The system of claim 1, wherein the remote access to the first lockbox to the first party over the computer network is provided at a time that is distinct from a time at which the remote access to the second lockbox to the second party over the computer network is provided.

7. The system of claim 1, wherein the remote access to the first lockbox to the first party over the computer network is provided at a same time at which the remote access to the secondary lockbox to the second party over the computer network is provided.

8. The system of claim 1, wherein the content in common is provided to the first client device at a time that is distinct from a time at which the content in common is provided to the second client device.

9. The system of claim 1, wherein the content in common is provided to the first client device and the second client device at a same time.

10. A computer implemented method for providing a repository executed by at least one processor, the method comprising:
   receiving, by the at least one processor, from a user interface of a first client device, a first access key from a first party;
   receiving, by the at least one processor, from a user interface of a second client device, a second access key from a second party, the second party being different from the first party;
   validating, by the at least one processor, the first access key and the second access key;
   in response to validating both the first access key and the second access key, providing remote access to a first lockbox of the repository to the first party and remote access to a second lockbox of the repository to the second party over a computer network, wherein the first lockbox and the second lockbox share content in common, and the content in common includes information unique to the first party and information unique to the second party; and responsive to the provided remote access, providing, through the computer network, the content in common to the first client device and the second client device, wherein the information unique to the first party is concurrently available on the user interface of the second client device for the duration the first party is remotely accessing the first lockbox and the information unique to the second party is concurrently available on the user interface of the first client device for the duration the second party is remotely accessing the second lockbox.

11. The method of claim 10, wherein the remote access to the second lockbox of the repository is provided to the second party in response to receiving an issuance of a death certificate of an owner of the repository.

12. The method of claim 10, wherein the remote access to the second lockbox of the repository is provided to the second party in response to receiving an issuance of a birth certificate of the first party.

13. The method of claim 10, wherein the second party is one of (a) a governmental entity, (b) a supplier of the repository, and (c) a professional individual associated with an owner of the repository.

14. The method of claim 10, wherein the remote access to the first lockbox to the first party over the computer network is provided at a time that is distinct from a time at which the remote access to the second lockbox to the second party over the computer network is provided.

15. The method of claim 10, wherein the remote access to the first lockbox to the first party over the computer network is provided at a same time at which the remote access to the secondary lockbox to the second party over the computer network is provided.

16. A non-transitory computer readable storage medium encoded with a computer program comprising instructions that, when executed, operate to cause at least one processor to perform operations for providing access control to a repository that comprises a first lockbox and a second lockbox, the operations comprising:

receiving, from a user interface of a first client device, a first access key from a first party;

receiving, from a user interface of a second client device, a second access key from a second party, the second party being different from the first party;

validating the first access key and the second access key;

in response to validating both the first and second access keys, providing remote access to the first lockbox to the first party and remote access to the second lockbox to the second party over a computer network, wherein the first lockbox and the second lockbox share content in common that includes information unique to the first party and information unique to the second party; and responsive to the provided remote access, providing, through the computer network, the content in common to the first client device and the second client device, wherein the information unique to the first party is concurrently available on the user interface of the second client device for the duration the first party is remotely accessing the first lockbox and the information unique to the second party is concurrently available on the user interface of the first client device for the duration the second party is remotely accessing the second lockbox.

17. The non-transitory computer readable storage medium of claim 16, wherein the remote access to the second lockbox of the repository is provided to the second party in response to receiving an issuance of a death certificate of an owner of the repository.

18. The non-transitory computer readable storage medium of claim 16, wherein the remote access to the second lockbox of the repository is provided to the second party in response to receiving an issuance of a birth certificate of the first party.

19. The non-transitory computer readable storage medium of claim 16, wherein the content in common is provided to the first client device at a time that is distinct from a time at which the content in common is provided to the second client device.

20. The non-transitory computer readable storage medium of claim 16, wherein the content in common is provided to the first client device and the second client device at a same time.

* * * * *